(12) United States Patent
Ringland et al.

(10) Patent No.: US 9,853,899 B2
(45) Date of Patent: Dec. 26, 2017

(54) METHOD AND SYSTEM FOR CONTROLLING TRAFFIC IN A WIRELESS LAN

(71) Applicant: BRITISH TELECOMMUNICATIONS public limited company, London (GB)

(72) Inventors: Simon Patrick Alexander Ringland, London (GB); Francis James Scahill, London (GB); Richard Joseph Evenden, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 129 days.

(21) Appl. No.: 14/780,990

(22) PCT Filed: Mar. 27, 2014

(86) PCT No.: PCT/GB2014/000123
§ 371 (c)(1),
(2) Date: Sep. 28, 2015

(87) PCT Pub. No.: WO2014/155045
PCT Pub. Date: Oct. 2, 2014

(65) Prior Publication Data
US 2016/0043953 A1 Feb. 11, 2016

(30) Foreign Application Priority Data
Mar. 28, 2013 (EP) ..................................... 13250045

(51) Int. Cl.
*H04L 12/26* (2006.01)
*H04L 12/803* (2013.01)
(Continued)

(52) U.S. Cl.
CPC ............ *H04L 47/125* (2013.01); *H04L 47/20* (2013.01); *H04L 47/22* (2013.01); *H04W 24/08* (2013.01);
(Continued)

(58) Field of Classification Search
CPC ....... H04L 47/125; H04L 47/22; H04L 47/20; H04W 24/08; H04W 72/10; H04W 28/0231; H04W 84/12
See application file for complete search history.

(56) References Cited

U.S. PATENT DOCUMENTS

2005/0047343 A1 3/2005 Sharony et al.
2005/0271009 A1 12/2005 Shirakabe
(Continued)

FOREIGN PATENT DOCUMENTS

EP 2424281 A1 2/2012

OTHER PUBLICATIONS

PCT International Search Report for PCT/GB2014/000123, dated May 6, 2014, 4 pages.
(Continued)

*Primary Examiner* — Afshawn Towfighi
(74) *Attorney, Agent, or Firm* — Patterson Thuente Pedersen, P.A.

(57) ABSTRACT

Embodiments provide a traffic control system for WLAN access points. The traffic control system works in dependence on a first input-user priority (supplied by an authentication server). This allows different service levels to be provided to different classes of customer. In addition, the traffic control system polices and/or shapes traffic based on a second input—a modulation rate detector, which measures the modulation rate at which each connected client is sending its traffic, and uses it to indirectly cause fairer use of the available air interface capacity (e.g. by causing TCP (Continued)

streams to back off when they detect packet loss). Finally, for some embodiments where public Wi-Fi is being delivered through private Wi-Fi access points, the traffic control system is to manage the air interface utilization split between public and private WiFi users, to ensure that private users do not have their Wi-Fi air interface network capacity unduly impaired by public users.

13 Claims, 5 Drawing Sheets

(51) Int. Cl.
    *H04W 28/02*     (2009.01)
    *H04L 12/813*     (2013.01)
    *H04L 12/815*     (2013.01)
    *H04W 24/08*     (2009.01)
    *H04W 72/10*     (2009.01)
    *H04W 84/12*     (2009.01)

(52) U.S. Cl.
    CPC ....... *H04W 28/0231* (2013.01); *H04W 72/10* (2013.01); *H04W 84/12* (2013.01)

(56) References Cited

U.S. PATENT DOCUMENTS

| | | |
|---|---|---|
| 2006/0146709 A1 | 7/2006 | Ginzburg |
| 2007/0124478 A1 | 5/2007 | Abdelhamid et al. |
| 2007/0291711 A1 | 12/2007 | Welch et al. |
| 2008/0080387 A1 | 4/2008 | Wang et al. |
| 2008/0080388 A1 | 4/2008 | Dean et al. |
| 2008/0117836 A1 | 5/2008 | Savoor et al. |
| 2008/0151751 A1 | 6/2008 | Ponnuswamy et al. |
| 2010/0080196 A1 | 4/2010 | Ho et al. |
| 2011/0305180 A1 | 12/2011 | Osterling |
| 2012/0224484 A1 | 9/2012 | Babiarz et al. |
| 2012/0314571 A1* | 12/2012 | Forssell ............... H04W 12/08 370/230 |
| 2013/0295989 A1 | 11/2013 | Smadi et al. |
| 2016/0057290 A1 | 2/2016 | Punwani et al. |
| 2016/0066227 A1 | 3/2016 | Townend |
| 2017/0006504 A1 | 1/2017 | Townend et al. |

OTHER PUBLICATIONS

Romdhani L et al: "Adaptive edcf: enhanced service differentiation for IEEE 802.11 wireless ad-Hoc networks", 2003 IEEE Wireless Communications and Networking Conference Record : Mar. 16-20, 2003, New Orleans, Louisiana, USA, IEEE Operations Center, Piscataway, NJ. vol. 2. Mar. 16, 2003 (Mar. 16, 2003), pp. 1373-1378, XP010639968. DOI: 10.1109/WCNC.2003.1200574 ISBN: 978-0-7803-7700-4.

Eng Hwee Ong et al: "A Unified QoS-inspired Load Optimization Framework for Multiple Access Points Based Wireless LANs", Wireless Communications and Networking Conference, 2009, WCNC 2009. IEEE. IEEE. Piscataway, NJ, USA, Apr. 5, 2009 (Apr. 5, 2009), pp. 1-6, XP031454044, ISBN: 978-1-4244-2947-9.

Andras Veres et al: "Supporting Service Differentiation in Wireless Packet Networks Using Distributed Control", IEEE Journal on Selected Areas in Communications, IEEE Service Center, Piscataway, US, vol. 19, No. 10, Oct. 1, 2001 (Oct. 1, 2001), XP011055477, ISSN: 0733-8716.

http://unixhelp.ed.ac.uk/CGI/man-cgi?tc+8, 2 pages.
http://en.wikipedia.org/wiki/Distributed_Coordination Function, 2 pages.
http://en.wikipedia.org/wiki/IEEE_802.11e-2005, 4 pages.
https://www.bt.com/btfon, 2 pages.
Li, B.J., and Soung, C.L. *Proportional Fairness in Wireless LANs and Ad Hoc Networks*. The Chinese University of Hong Kong, 6 pages.
International Search Report, for PCT Application No. PCT/GB2014/053705, dated Mar. 9, 2015, 2 pages.
PCT International Search Report for PCT Application No. PCT/GB2014/000122, dated May 6, 2014, 3 pages.
Application and File History for U.S. Appl. No. 15/104,283, filed Jun. 14, 2016. Inventors: Townend et al.
Application and File History for U.S. Appl. No. 14/781,005, filed Sep. 28, 2015. Inventor: Townend.
Murty, "Dyson: An Architecture for Extensible Wireless LANs", Microsoft Research, Harvard University, 14 pages.

* cited by examiner

METHOD AND SYSTEM FOR CONTROLLING TRAFFIC IN A WIRELESS LAN

RELATED APPLICATIONS

The present application is a National Phase entry of PCT Application No. PCT/GB2014/000123, filed Mar. 27, 2014, which claims priority to EP 13250045.5, filed Mar. 28, 2013, the contents of which are incorporated herein by reference in their entireties.

TECHNICAL FIELD

Embodiments provide a method and system for controlling data traffic in a wireless LAN, such as an IEEE 802.11x LAN. In particular, embodiments provide for traffic shaping and/or policing to be performed between users connected via a common wireless access point in dependence on user priority, and/or the modulation scheme being used to transmit data to

BACKGROUND

Existing Wi-Fi systems have to share a finite resource of a given radio channel between all stations wanting to use the medium. The current standard mechanism (the Distributed Coordination Function (DCF), described further below) for sharing out this resource treats all stations as equal, regardless of whether they are access points or mobile terminals, and is "fair" in the sense of giving each station the same chance of being the next station to get a packet onto the air interface. While this mechanism is robust, it does not always provide an optimal method of sharing out the available resource. In particular, it takes no account of the following factors:

1/ There is no concept of user priority, and hence it is not possible to differentiate between users who may be expecting different classes of service.
2/ The standard mechanisms deployed in commercial access points take no account of the proportion of the available air interface resource that any given station is consuming Stations at different ranges from an access point will use different modulation rates when transmitting. For example, a station close to an access point might transmit at 54 Mbps, where one at the edge of coverage might be transmitting at only 1 Mbps. As the DCF allows them to send the same number of packets, if they send the same size packets, the edge of coverage station will be using 54 times as much airtime as the station close to the access point. This may not be the optimal use of resources.
3/ For public Wi-Fi access via private access points (as used in the Applicant's public access Wi-Fi network known as BT FON), the standard mechanisms do not take air interface usage into account in differentiating between public and private users. In this respect, presently only backhaul usage is typically taken into account, which does not have a 1:1 relationship with air interface usage. That is, the present BT WiFi network currently separates public and private Wi-Fi traffic, and offers bandwidth protection to the private users on the basis of backhaul traffic flow rates.

Traffic control is a well known concept in computer networking. For example Linux Traffic Control 'tc' (see http://unixhelp.ed.ac.uk/CGI/man-cgi?tc+8) implements a mechanism for implementing traffic policing, shaping, scheduling and dropping. In 802.11 Wi-Fi networks, access to the transmission medium has been traditionally controlled using the Distributed Coordination Function (see: http://en.wikipedia.org/wiki/Distributed_Coordination_Function).

In its basic form, this mechanism attempts to make access to the medium "fair," in the sense that each station has an equal chance of being the next one to put a packet on the air. Essentially each station is allowed to transmit the same number of packets as each of the others.

WMM QoS (a profile of the IEEE802.11e Quality of Service spec) modifies the DCF to allow for the prioritization of certain types of traffic based on a number of traffic categories: Voice, Video, Best Efforts and Background.

As described at http://en.wikipedia.org/wiki/IEEE_802.11e-2005, IEEE802.11e enhances the DCF and the point coordination function (PCF), through a new coordination function: the hybrid coordination function (HCF). Within the HCF, there are two methods of channel access, similar to those defined in the legacy 802.11 MAC: HCF Controlled Channel Access (HCCA) and Enhanced Distributed Channel Access (EDCA). Both EDCA and HCCA define Traffic Categories (TC). For example, emails could be assigned to a low priority class, and Voice over Wireless LAN (VoWLAN) could be assigned to a high priority class.

With EDCA, high-priority traffic has a higher chance of being sent than low-priority traffic: a station with high priority traffic waits a little less before it sends its packet, on average, than a station with low priority traffic. This is accomplished through the TCMA protocol, which is a variation of CSMA/CA using a shorter arbitration inter-frame space (AIFS) for higher priority packets. The exact values depend on the physical layer that is used to transmit the data. In addition, EDCA provides contention-free access to the channel for a period called a Transmit Opportunity (TXOP). A TXOP is a bounded time interval during which a station can send as many frames as possible (as long as the duration of the transmissions does not extend beyond the maximum duration of the TXOP). If a frame is too large to be transmitted in a single TXOP, it should be fragmented into smaller frames. The use of TXOPs prevents stations from sending large numbers of high priority frames in a single go at low modulation rates. Alternatively, it allows fast stations to send several frames in one go. (TXOP is set to low values for the high priority access categories.)

A TXOP time interval of 0 means it is limited to a single MAC service data unit (MSDU) or MAC management protocol data unit (MMPDU). Best effort traffic generally has a TXOP of zero, which does mean just one MSDU, but at the edge of coverage with a low modulation rate, that could be quite a lot of airtime.

The levels of priority in EDCA are called access categories (ACs). The contention window (CW) can be set according to the traffic expected in each access category, with a wider window needed for categories with heavier traffic. The CWmin and CWmax values are calculated from aCWmin and aCWmax values, respectively, that are defined for each physical layer supported by 802.11e.

In other prior art, in Li, B. J., and Soung, C. L. *Proportional Fairness in Wireless LANs and Ad Hoc Networks* The Chinese University of Hong Kong (available online at http://www.ie.cuhk.edu.hk/fileadmin/staff_upload/soung/Conference/C56.pdf), Li and Soung disclose a method for ensuring fairness in terms of equal airtime where they consider infrastructure WLANs in which all WSs communicate with an AP. They assume the AP maintains a separate queue for each WS so that for the downlink traffic, it can allocate different bandwidths to the queues in a flexible manner. For downlink traffic, the AP acts as the coordinator to allocate the air-time equally to the WSs. For uplink traffic scheduling they disclose either:

1. Using equal TXOP length in each WS

A straightforward approach to implement proportional fairness for uplink traffic in a WLAN is to utilize packet bursting from WSs, as defined in 802.11e standard [11], while keeping the CWs unchanged (identical for all the WSs). The bursting lengths (i.e., TXOP lengths, expressed in "seconds") are set as the same for all WSs to achieve equal air-time usage, independent of the WSs' individual data rates. Since 802.11 MAC implicitly provides long-term equal access probability to all the WSs, equal TXOP for all the WSs leads to equal airtime occupancy in a long term; or 2. Adjusting Initial CWs of different WSs It is also possible to alternatively tune the initial CWs (CWMin's) of the WSs to achieve this goal for uplink traffic. The value of CWMin's can be distributed from the AP to the WSs, since the AP knows the individual air-time used by one burst from each WS.

Thus, whilst Li and Soung teach a method for upstream air-time fairness, they do not use upstream policing. Their approach (1) using equal TxOP length cannot blend different user priorities with air-time fairness as all users get the same TxOP. Their approach (2) using varying CWmin values per station has practical limitations in terms of the rate at which it can adapt to changing load and in the generation of additional Probe Request/Response pairs which run at the lowest modulation rate, and therefore will cause additional congestion. It will also increase packet fragmentation and therefore decrease the overall efficiency of the channel usage. Moreover, adopting any upstream policing technique requires adaptation at the actual sending client device, which imposes practical implementation difficulties in terms of manufacturer adoption and compatibility with legacy devices.

SUMMARY

Embodiments attempt to address the two issues of user prioritization and fairer sharing of available bandwidth identified above, by making modifications to the traffic control system within access points in a wireless LAN (WLAN) network, leaving the mobile stations unchanged, and without changing the network's physical or MAC layer.

Embodiments therefore define a new traffic control system for WLAN access points. The traffic control system works in dependence on a first new input—user priority (supplied by an authentication server). This allows different service levels to be provided to different classes of customer. In addition, the traffic control system polices and/or shapes traffic based on a second new input—a modulation rate detector, which measures the modulation rate at which each connected client is sending its traffic, and uses it to indirectly cause fairer use of the available air interface capacity (e.g. by causing TCP streams to back off when they detect packet loss). Finally, for some embodiments where public Wi-Fi is being delivered through private Wi-Fi access points (such as the BT Wi-Fi service https://www.bt.com/btfon), the traffic control system is able to manage the air interface utilization split between public and private Wi-Fi users, to ensure that private users do not have their Wi-Fi air interface network capacity unduly impaired by public users.

In view of above, from a first aspect there is provided a method of controlling data traffic in a wireless local area network (WLAN), comprising: determining respective priority levels for wireless stations communicating with a wireless access point; calculating wireless traffic load on the WLAN in dependence on wireless station data rates and modulation rates; and for a wireless station, setting a traffic flow control limit in dependence on the wireless station priority level and the calculated wireless traffic load; wherein the setting comprises reducing a traffic flow control limit when the wireless traffic load is above a threshold level, and increasing the traffic flow control limit when the wireless traffic load is below the threshold level.

From another aspect there is also provided traffic flow control limit calculator for use with a wireless local area network access point, the calculator being arranged to: i) determine respective priority levels from a user priority store for wireless stations communicating with a wireless access point; ii) calculate wireless traffic load on the WLAN in dependence on wireless station data rates and modulation rates as determined by a modulation rate detector; and iii) for a wireless station, set a traffic flow control limit in dependence on the wireless station priority level and the calculated wireless traffic load; wherein the setting comprises reducing a traffic flow control limit when the wireless traffic load is above a threshold level, and increasing the traffic flow control limit when the wireless traffic load is below the threshold level.

In some embodiments the traffic flow control limit is a traffic shaper limit or traffic policer limit.

Moreover, in some embodiments the traffic flow control limit calculator forms part of a wireless LAN access point, the access point further including a wireless network interface; upstream and downstream traffic control systems; a modulation rate detector; and a user priority store. In other embodiments the calculator may be physically separate from the access point, for example in a WLAN architecture where lightweight access points are controlled by a separate network controller.

Further features and advantages of embodiments will be apparent from the appended claims.

BRIEF DESCRIPTION OF THE DRAWINGS

Further features and advantages of the disclosure will become apparent from the following description of embodiments thereof, presented by way of example only, and by reference to the accompanying drawings, wherein like reference numerals refer to like parts, and wherein.

DESCRIPTION OF THE EMBODIMENTS

Embodiments relate to channel capacity allocation and utilization by multiple wireless stations in a wireless local area network. The typical usage scenario is where a wireless access point operating in accordance with one or more of the IEEE 802.11 family of standards provides network access to one or more wireless stations operated by users. The wireless stations may be any mix of computers such as laptops, tablet devices such as iPads® and the like, or other mobile devices such as smartphones. The users may be a mix of public users and private users, the distinction being that private users will typically access the wireless access point using an encrypted connection using the WEP, WPA or WPA2 security protocols, and will typically be granted a greater share of the access point's resources than public users. In addition, private users will have access to the local LAN as well as the internet, whereas public users will generally only have access to the internet. In some embodiments, however, all or almost all of the users may be public users, such as for access points located to provide network access to users in public locations such as hotels, airports, railway stations and the like.

A purpose of embodiments is to provide a traffic control system for WLAN traffic that provides for fairer use of the wireless resource based on concepts of user priority, and wireless resource utilization. In particular, embodiments try to provide a higher priority user with a greater share of use of the wireless resource than a lower priority user. In addition, embodiments also try to prevent "inefficient" users with low modulation rates from capturing the wireless resource, and blocking the use thereof by more efficient users who are able to user higher modulation rates. For example, a user at the edge of coverage who has to use a less efficient modulation scheme than a closer user who can use a more efficient modulation scheme should be prevented from using more than his share of the wireless bandwidth.

Figure 1:
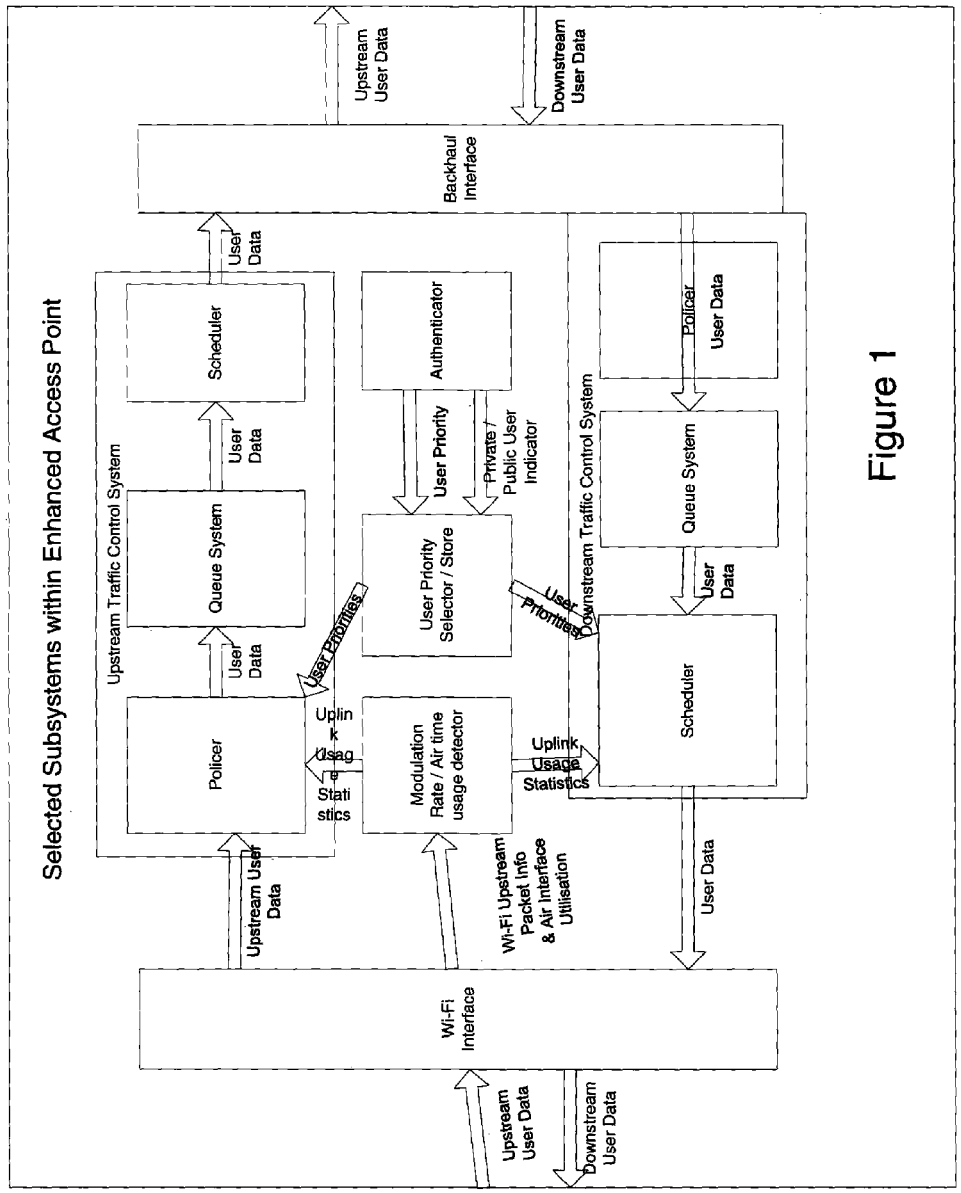
FIG. 1 is a block diagram of a wireless access point in accordance with an embodiment.

FIG. 1 is a block diagram of an access point according to an embodiment. The access point includes a backhaul interface which is arranged to provide backhaul for upstream and downstream data from the access point to a core network, such as the Internet. For downstream data the backhaul interface passes downstream data to a downstream traffic control system, comprising in turn a policer module, a queue system and a scheduler. The scheduler passes user data to the Wi-Fi interface module for transmission over the wireless interface to the user wireless devices.

In other embodiments, different access point architectures may be used, for example controller based architectures where the access point functionality is split between a lightweight access point (AP) and a separate WLAN controller.

In addition to the downstream path, an upstream traffic control system comprises a policer, a queue system and scheduler, arranged in order to receive upstream user data from the Wi-Fi interface. The scheduler outputs the user data to the backhaul interface for onward transmission over the Internet or other network to which the access point is connected.

In addition to the upstream and downstream traffic control systems, the access point also comprises control elements, in the form of an authenticator and a user priority selector and store. The authenticator stores user priority information as well as information as to whether a user is a public user or a private user. This information is passed when required to the user priority selector and store. In turn the user priority selector passes user priority information to the policer in the upstream traffic control system, and also to the scheduler in the downstream traffic control system.

Additionally provided is a modulation rate and airtime usage detector. This receives information from the Wi-Fi interface relating to upstream packets and utilization of the air interface.

Figure 2:
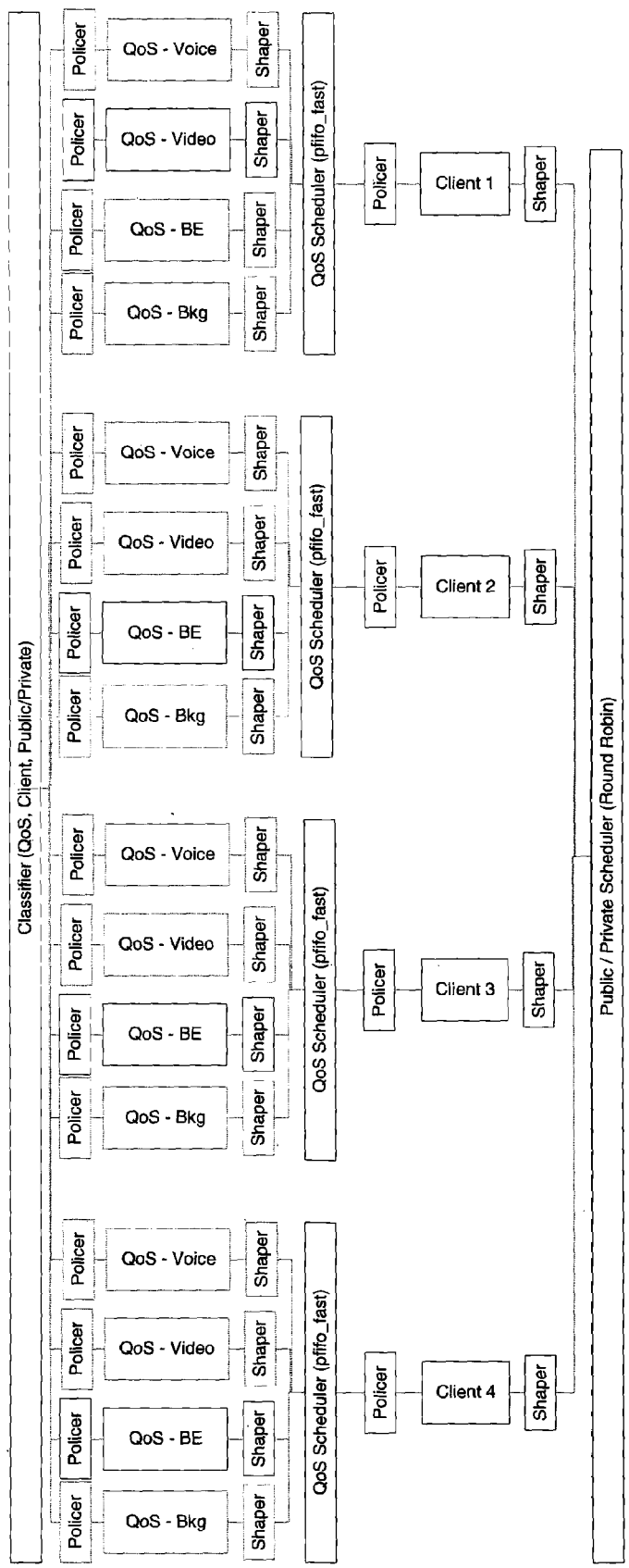
FIG. 2 is a block diagram of the arrangement of traffic queues in an embodiment.

FIG. 2 illustrates example traffic queues for different data traffic types for different users, and how they can be policed or shaped depending on whether the traffic is being sent upstream or downstream.

In order to explain the operation of the access point of the present embodiment, we shall describe an example scenario where four users (Client 1, Client 2, Client 3, and Client 4) connect to the same access point, with differing user priorities and data traffic requirements. Each client is a conventional WLAN enabled device, such as a computer, smartphone, or tablet.

The first step is to perform authentication for each client. Authentication is performed using the Extensible Authentication Protocol, defined in RFC 3748 and related IETF standards. The authentication process is as follows:

1. Client 1 connects to public SSID on the AP and performs EAP-SIM based authentication. (AP forwards authentication request to Radius proxy which forwards to MNO.) Standard authentication process is followed. When user successfully authenticates, an EAP-SUCCESS message is sent, encapsulated in Radius, with a vendor specific attribute identifying the user priority as priority Public-1 "Gold" (out of 3 possible public levels). The authenticator then passes the user identifier together with the priority level to the User Priority Selector/Store.
2. Client 2 connects to public SSID on the AP and performs EAP-SIM based authentication. (AP forwards authentication request to Radius proxy which forwards to MNO.) Standard authentication process is followed. When user successfully authenticates, an EAP-SUCCESS message is sent, encapsulated in Radius, with a vendor specific attribute identifying the user priority as priority Public-1 "Gold" (out of 3 possible public levels). The authenticator then passes the user identifier together with the priority level to the User Priority Selector/Store.
3. Client 3 connects to public SSID on the AP and follows the same process as above, but the EAP-SUCCESS message is accompanied by a priority level of Public-3 (Bronze). The authenticator then passes the user identifier together with the priority level to the User Priority Selector/Store.
4. Client 4 connects to the private SSID of the AP using WPA2-PSK (pre-shared key). The AP authenticator automatically allocates this user to the priority class "Private." The authenticator then passes the user identifier together with the priority level to the User Priority Selector/Store.

The table below therefore summarizes the present priority status of the four example users.

| Client ID (MAC address) | Priority |
| --- | --- |
| Client 1 MAC | Public-1 |
| Client 2 MAC | Public-3 |
| Client 3 MAC | Public-1 |
| Client 4 MAC | Private |

Consider now example traffic demand from the clients, as follows:

1. Client 1 initiates a video call, which includes two UDP streams, one in the uplink direction and one in the downlink direction. Client 1 is close to the access point and when sending/receiving is working at a physical rate of 54 Mbps.
2. Client 2 starts downloading a large download (e.g. a new version of its Operating System) using TCP. This creates high volumes of downlink data packets and corresponding uplink acknowledgements. Client 2 is close to the access point and when sending/receiving is working at a physical rate of 54 Mbps.
3. Client 3 starts downloading a large download (e.g. a new version of its Operating System) using TCP. This creates high volumes of downlink data packets and corresponding uplink acknowledgements. Client 3 is far away from the access point and when sending/receiving is working at a physical rate of 1 Mbps.
4. Client 4 also starts a large download. This creates a TCP stream with data packets downstream and acknowledgements upstream. Client 3 is close to the access point and when sending/receiving is working at a physical rate of 54 Mbps.
5. Other clients of different access points and those other access points are also consuming a portion of the available airtime.
6. While Client 1 has significant but finite peak rate traffic demands, Clients 2, 3 and 4 are attempting to download data at the maximum possible rate.

Conventionally, without the benefits of the present embodiment, the following would be the outcome of such a usage scenario:
1. Client 1 uses WMM QoS (Video) and manages to get its packets onto the air. Its user is happy.
2. Clients 2, 3, and 4 compete for the remaining available airtime. Each has an equal chance of getting their packets onto the air, so each end up with the same packet rate. However, Client 3's packets occupy 54 times as much airtime as those of Clients 2 or 4. As a result, Clients 2, 3 and 4 all end up running at the (slow) rate of Client 2. Client 3 is happy, as he is getting as much as he can expect. Clients 2 and 4 are unhappy; they are being slowed down by Client 2, a Public Bronze grade customer at the edge of coverage.

Figure 3:
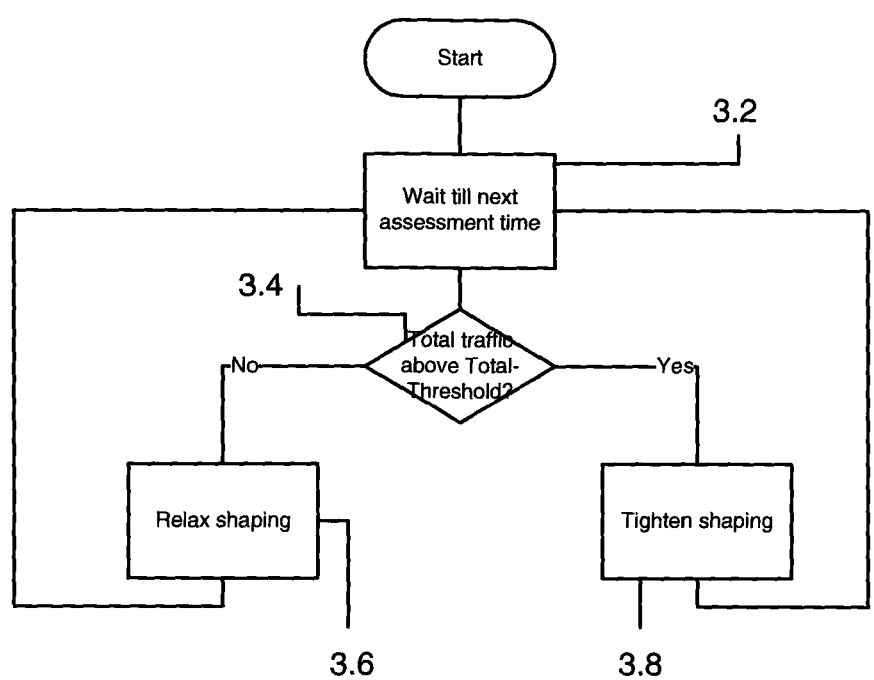
FIG. 3 is a flow diagram illustrating the operation of an embodiment.

In order to address the above problem, the present embodiment provides a method and system to adapt the traffic shaping and/or policing that is applied to transmitted packets. In particular, as shown in FIG. 3, the present embodiment provides a method and system which runs repeatedly, and repeatedly performs an evaluation at 3.4 as to whether the total traffic that is being transmitted via the access point is above a total threshold measure, for example 80% of the channel capacity. If it is, then at 3.8 a "tighten shaping" operation is undertaken, as will be described in more detail below. Alternatively, if the total traffic is below the total threshold measure, then at 3.6 a "relax shaping" operation is undertaken, again as will be described in more detail later. Whichever operation is undertaken, the process then proceeds to a wait state 3.2, where a timer counts down to the next assessment time to evaluate the condition of 3.4. In such a manner the traffic shaping and/or policing arrangement of the present embodiment can run repeatedly. For example, traffic shaping may be undertaken every 0.1 seconds or so.

In more detail:
1. The Modulation Rate/Air time Usage Detector detects the current modulation rates of each client and measures the % of available airtime used by each client for each QoS class (upstream+downstream) over a specified period (e.g. 0.1 second) and passes the information to the Upstream and Downstream Traffic Control Systems.

| Client ID (MAC address) | Modulation Rate (Mbps) | % Airtime* Used for QoS Class: Voice | % Airtime* Used for QoS Class: Video | % Airtime* Used for QoS Class: Best Efforts (or no WMM QoS) | % Airtime* Used for QoS Class: Background |
|---|---|---|---|---|---|
| Client 1 MAC | 54 | | 25 | | |
| Client 2 MAC | 54 | | | 1 | |
| Client 3 MAC | 1 | | | 54 | |
| Client 4 MAC | 54 | | | 1 | |

*This figure is the % of airtime available to this access point and its clients (and excludes that proportion of airtime used by other access points and their clients.)

2. The Downstream Scheduler & Upstream Policer calculate the total airtime usage and determine that the medium is over utilised (utilisation above a threshold percentage—e.g. 80%). This means that it is likely that some clients are not getting as much air-time access as they would like. It therefore determines that active traffic shaping/policing is required.
3. The Downstream Scheduler & Upstream Policer calculate the effective data rate for each client in each QoS class (e.g. by multiplying the channel utilisation by the modulation rate). (Alternatively, this could be observed and provided directly by the Modulation Rate/Air time Usage Detector, in addition to the above information.)

Example values before the system has been applied are shown in the table below:

| Client ID (MAC address) | Priority | Modulation Rate (Mbps) | % Airtime Used (Data rate Mbps) for QoS Class: Voice | % Airtime Used (Data rate Mbps) for QoS Class: Video | % Airtime Used (Data rate Mbps) for QoS Class: Best Efforts (or no WMM QoS) | % Airtime Used (Data rate Mbps) for QoS Class: Background |
|---|---|---|---|---|---|---|
| Client 1 MAC | Public-1 | 54 | | 25 (13.5) | | |
| Client 2 MAC | Public-3 | 1 | | | 54 (0.54) | |
| Client 3 MAC | Public-1 | 54 | | | 1 (0.54) | |

-continued

| Client ID (MAC address) | Priority | Modulation Rate (Mbps) | % Airtime Used (Data rate Mbps) for QoS Class: Voice | % Airtime Used (Data rate Mbps) for QoS Class: Video | % Airtime Used (Data rate Mbps) for QoS Class: Best Efforts (or no WMM QoS) | % Airtime Used (Data rate Mbps) for QoS Class: Background |
|---|---|---|---|---|---|---|
| Client 4 MAC | Private | 54 | | | 1 (0.54) | |

4. Operation of the system then proceeds according to FIG. 3, as described above. With usage of the available airtime at 81% (above the 80% Total-Threshold value), the system proceeds down the Tighten Shaping Flowchart, as shown in FIG. 4.

Figure 4:
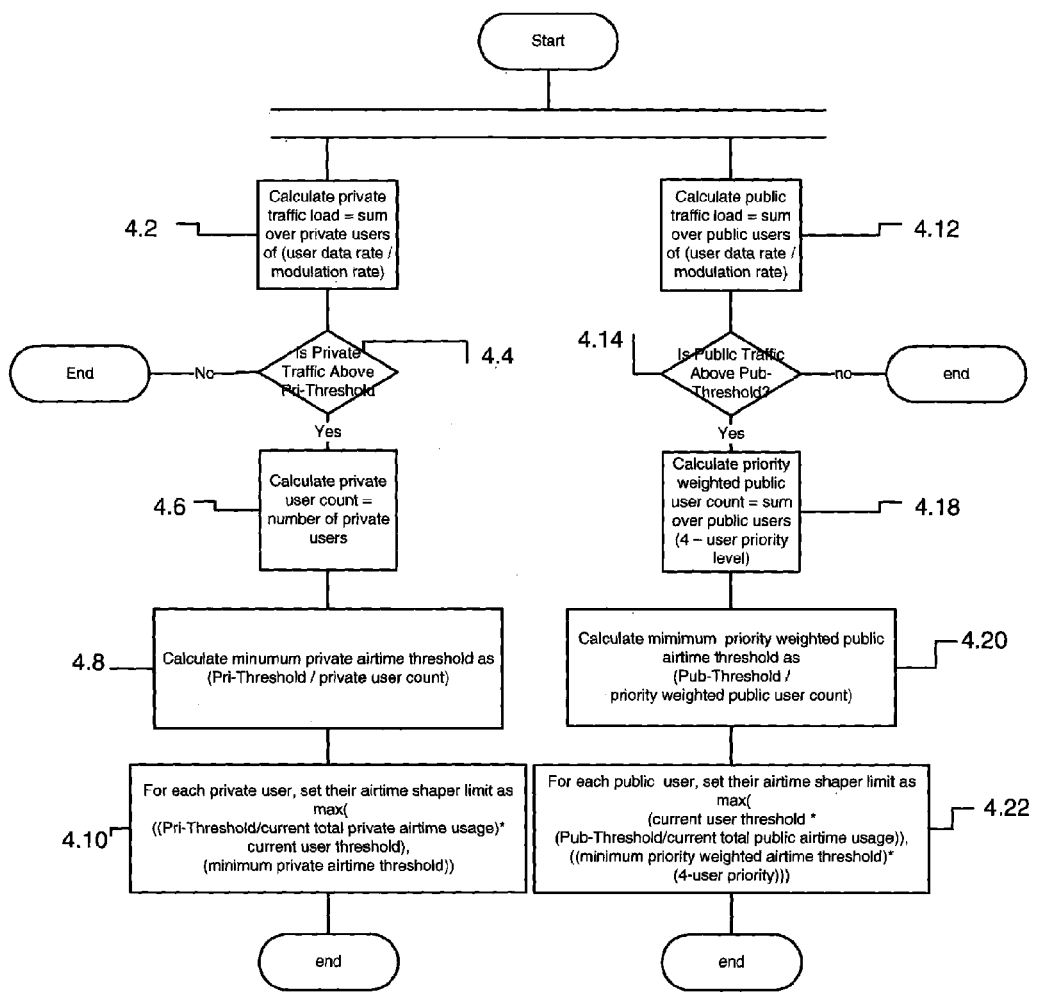
FIG. 4 is a flow diagram illustrating the operation of a "tighten shaping" mode of operation of an embodiment.

With reference to FIG. 4, here is shown two separate shaping processes that are applied for private and public traffic respectively. The left hand column of 4.2 to 4.10 are performed in respect of the private users, and the right hand column of 4.12 to 4.22 are performed for the public users. With respect to the private users, at 4.2 the private traffic load is calculated to be the sum over all the private users of the ratio of user data rate to modulation rate, i.e.

Private_traffic_load=Σ(userdata_rate/modulation_rate)

where the summation is taken across each private user.

Next, at 4.4 a comparison is made of the calculated private traffic load to determine whether it is above a preset private threshold level Pri_threshold. Pri_threshold may be set at for example 70% of the available channel capacity, thus leaving 30% available for public use. That is, the sum of the private threshold level and a public threshold level Pub_threshold should equal to 100% of the available channel capacity (which may itself be only a fraction, e.g. 80%, of the theoretical maximum, due to user interfering wireless users on adjacent access points).

Where the private traffic load is above the private threshold level, then it is necessary to tighten the private traffic shaping conditions, and this is performed at 4.6 to 4.10. In particular, at 4.6 a variable is set equal to the number of private users registered with the access point, i.e. private_user_count=number of private users. This variable is then used at 4.8 to calculate a minimum private airtime threshold equal to the quotient of the preset private threshold and the private user count, i.e.

Minimum_private_airtime_usage=Pri_threshold/private_user_count

This gives a minimum private airtime that should be allocated to each private user, by simply dividing the available airtime between the number of private users.

However, it may be that the above solution is not optimal, particularly if some users do not actually need an equal division of airtime because their data needs are low, or they are transmitting using very efficient modulation. Therefore, at 4.10 a choice is made for each private user as to whether to grant them either the calculated minimum private airtime usage, or whether to scale their current usage by the ratio of the private threshold to the current private traffic load, i.e.

Airtime_shaper_limit=Max [((Pri_threshold/Private_traffic_load)*current_user_threshold),(Minimim_private_airtime_usage)]

where the maximum of the two choices is chosen. In this respect, the current_user_threshold is the current threshold limit for that user. This equation calculates the new threshold for that user.

Thus, for private users the available capacity is either shared equally to meet the capacity limit, or adapted over iterations such that it distributes spare private capacity to those stations demanding extra capacity, but ensures that each private station receives at least a minimum entitlement.

For public users the right hand branch of FIG. 4 is followed. Here, at s.4.12 the airtime public traffic load is found to be the sum over all public users of the ratio of each user's data rate to its modulation rate i.e.

Public_traffic_load=Σ(user_data_rate/modulation_rate)

Then, at 4.14 an evaluation is carried out to determine if the public traffic load is above a preset public traffic threshold Pub_threshold, e.g. 30%, as discussed previously. If this is the case, then the traffic shaping should be tightened, using 4.18 to 4.22. Otherwise, the tighten shaping procedure can end. In many embodiments the relax shaping procedure can then be invoked, often depending on the outcome of the flowchart of FIG. 3 on its next iteration.

Assuming that the traffic shaping is to be tightened, at 4.18 a priority weighted public user count is found to be the sum over all public users of the variable (4−user_priority_level), where user_priority_level takes a value of 1 to 3, i.e.

Priority_weighted public_user_count=Σ(4−user_priority_level).

Hence, higher priority public users (i.e. priority=1) contribute to this count more than lower priority users (i.e. priority=3). More generally, where there are n priority levels, the priority weighted public user count can take the value:

Priority_weighted_public_user_count=Σ((n+1)−user_priority_level).

Next, at 4.20 a minimum priority-weighted public airtime threshold is calculated to be the quotient of the public threshold Pub_threshold and the priority weighted public user count i.e.:

Minimum_priority_weighted_public_airtime_threshold=Pub_threshold/Priority_weighted_public_user_count The minimum priority weighted public airtime threshold provides the lowest unit of airtime that may be allocated, as will be seen from 4.22.

More particularly, at 4.22, an airtime shaper limit is set for each public user, using the above found variables. In particular, the limit is set to the maximum value of either: i) the product of the user's present threshold with the ratio of preset public threshold level to the actual public traffic load; or ii) the product of the minimum priority weighted public airtime threshold with a variable dependent on the user priority, calculated as ((n+1)−user_priority), where there are n priority levels. In the presently described embodiment there are three priority levels, although in other embodiments there may be more than or fewer than three. Hence, in ii) a higher priority user will be allocated more airtime than a lower priority user. Again, the choice of taking the maximum of these two choices is to make the system flexible in that if one user is not using all of their allocation then others can use it.

5. In view of the above, and returning to the worked example, traffic shaping is applied in the downstream direction (see FIG. 2). User traffic quotas are enforced at the relevant client shapers. The QoS shapers are only used to prevent abuse of the higher WMM QoS classes (e.g. 100 kbps for Voice, 15 Mbps Video). (Note: for simplicity, details of upstream policing have been omitted. In the full implementation, both upstream and downstream traffic are considered for calculating an individual client's usage. Each user's total airtime usage quota is calculated as shown, but it is allocated between upstream and downstream traffic in a similar manner to the way traffic is allocated between users. Upstream traffic is policed, where the downstream traffic is shaped.)

For the present example values after the system has converged are shown in the table below where 50% of total usable capacity (i.e. 50% of 80%=40%) is reserved for Private users, when they need it.

| Client ID (MAC address) | Priority | Modulation Rate (Mbps) | % Airtime Used (Data rate Mbps) for QoS Class: Voice | % Airtime Used (Data rate Mbps) for QoS Class: Video | % Airtime Used (Data rate Mbps) for QoS Class: Best Efforts (or no WMM QoS) | % Airtime Used (Data rate Mbps) for QoS Class: Background |
|---|---|---|---|---|---|---|
| Client 1 MAC | Public-1 | 54 | | 17 (11.3) | | |
| Client 2 MAC | Public-3 | 1 | | | 6 (0.06) | |
| Client 3 MAC | Public-1 | 54 | | | 17 (9.1) | |
| Client 4 MAC | Private | 54 | | | 40 (21.6) | |

Thus, as will be seen from the table above, there is a fairer split between the percentage of airtime user for the two public clients of priority 1, and the private user is also allocated an appropriate amount of the bandwidth. However, the public user with priority class 3 is no longer able to dominate the airtime, and his data rate has become severely restricted to allow for the higher priority clients that are able to send and receive at much higher data rates. Hence, the various users no longer end up with the performance of the lowest performing client, as in the prior art, and are instead able to share the wireless resource in a manner that allows service differentiation between different classes of user, and improves overall data throughput to most clients.

6. Sometime later, the private user completes his download and does not make any further use of the channel. The channel is now running below capacity so the system operates the Relax Shaping process of FIG. 5, as described below. After convergence the traffic load looks as follows (note that Client 1 is now running at its requested rate, and would be permitted to run faster if it wanted to):

| Client ID (MAC address) | Priority | Modulation Rate (Mbps) | % Airtime Used (Data rate Mbps) for QoS Class: Voice | % Airtime Used (Data rate Mbps) for QoS Class: Video | % Airtime Used (Data rate Mbps) for QoS Class: Best Efforts (or no WMM QoS) | % Airtime Used (Data rate Mbps) for QoS Class: Background |
|---|---|---|---|---|---|---|
| Client 1 MAC | Public-1 | 54 | | 27 (14) | | |
| Client 2 MAC | Public-3 | 1 | | | 13 (0.13) | |
| Client 3 MAC | Public-1 | 54 | | | 40 (21.9) | |
| Client 4 MAC | Private | 54 | | | 0 (0) | |

Figure 5:
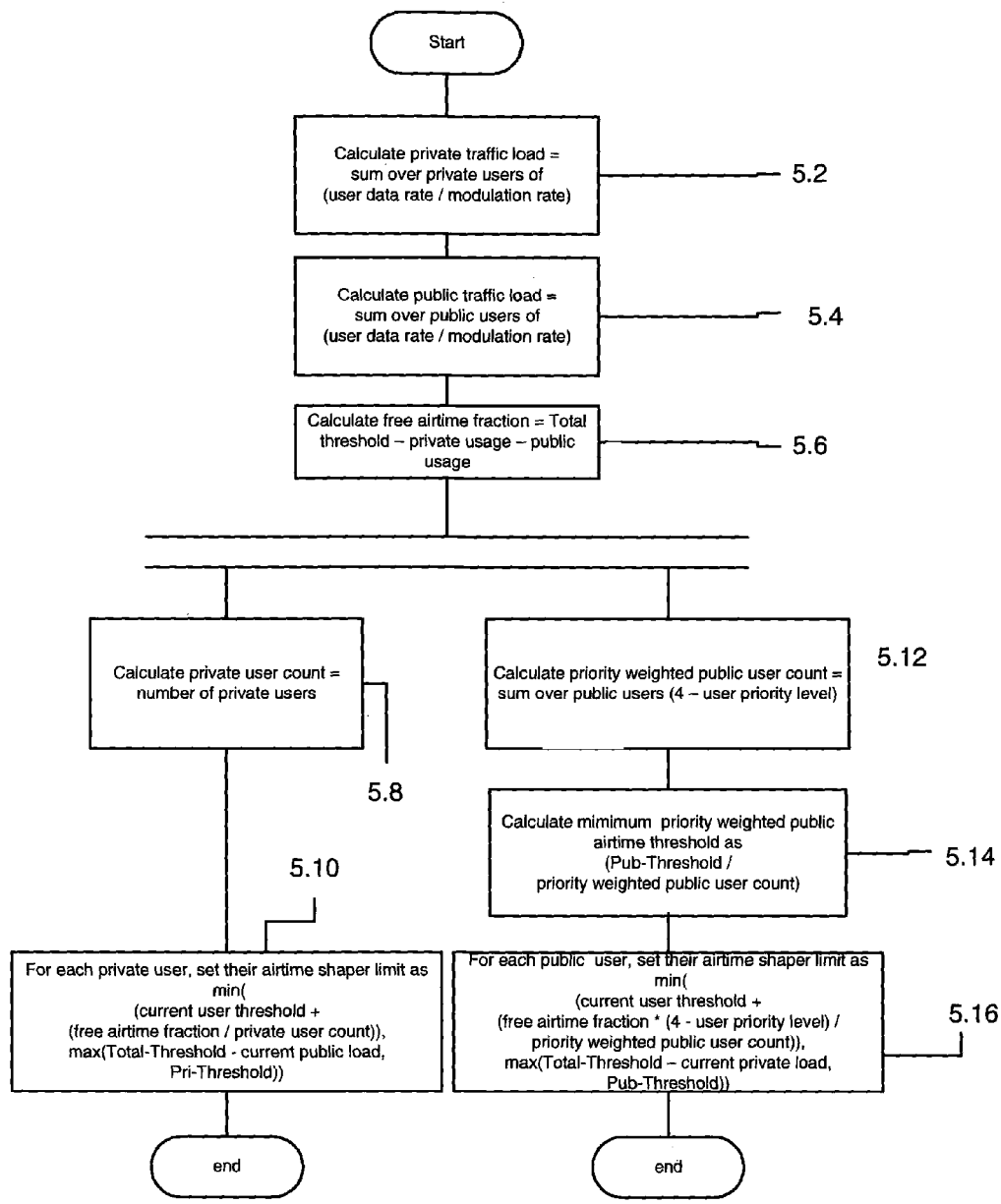
FIG. 5 is a flow diagram illustrating the operation of a "relax shaping" mode of operation of an embodiment.

With reference to FIG. 5, the relax shaping process of 3.6 is performed as follows. Firstly, at 5.2 and 5.4 the private and public traffic loads are calculated, in the same manner as previously described in 4.2 and 4.12, respectively, previously. Then, a free_airtime_fraction value is found at 5.6, which is equal to the total available airtime, minus the amount that is being used already for public and private users. In this respect, recall that the relax shaping process is being used because there should now be free airtime from at least one of the public or private allocations, because a previous user has stopped transmitting or receiving.

Having calculated the free airtime fraction, for private users a private_user_count variable is then found at 5.8, equal to the number of private users, and this is then deployed in 5.10 to determine each user's airtime shaper limit to be the lower of:
  i) the sum of the current user threshold plus the ratio of the free airtime fraction to the private user count; or
  ii) the greater of the private threshold, or the total threshold minus the current public traffic load.
I.e., $$\min[(\text{current\_user\_threshold}+(\text{free\_airtime\_fraction}/\text{private\_user\_count})), \max(\text{Total\_Threshold}-\text{public\_traffic\_load}, \text{Pri\_Threshold})]$$

Thus, as in the tighten shaping procedure, the relax shaping procedure either sets the new airtime shaper limit to be a function of the old limit plus a share of the free airtime that is available, or to a set figure depending on a difference between the total and public loads, or the private threshold, whichever is the smallest. The objective is to relax the traffic shaping as quickly as possible once capacity becomes available, without overshooting so that traffic tightening then becomes necessary.

With respect to the public users, at 5.12 a priority weighted public user count is found to be the sum over all public users of the variable $((n+1)-\text{user\_priority\_level})$, where n is the number of user priority levels. In the described embodiment user_priority_level takes a value of 1 to 3, i.e.

$$\text{Priority\_weighted\_public\_user\_count}=\Sigma(4-\text{user\_priority\_level}).$$

Hence, higher priority public users (i.e. priority=1) contribute to this count more than lower priority users (i.e. priority=3). More generally, however, the count can be found as:

$$\text{Priority\_weighted\_public\_user\_count}=\Sigma((n+1)-\text{user\_priority\_level})$$

where n is the number of priority levels.

Next, at 5.14 a minimum priority-weighted public airtime threshold is calculated to be the quotient of the public threshold Pub_threshold and the priority weighted public user count, i.e.:

$$\text{Minimum\_priority\_weighted\_public\_airtime\_threshold}=\text{Pub\_threshold}/\text{Priority\_weighted\_public\_user\_count}$$

The minimum priority weighted public airtime threshold provides the lowest unit of airtime that may be allocated, as will be seen from 5.16. Note that 5.12 and 5.14 are identical to 4.18 and 4.20 described previously during the tighten operation.

Finally, the above calculated values are then deployed in 5.16 to determine each user's airtime shaper limit to be the lower of:
  iii) the sum of the current user threshold plus the ratio of the product of the free airtime fraction and $((n+1)-\text{user}$ priority level) (where n is the number of user priority levels) to the priority weighted public user count; or
  iv) the greater of the public threshold, or the total threshold minus the current private traffic load.
I.e., $$\min[(\text{current\_user\_threshold}+(\text{free\_airtime\_fraction}*((n+1)-\text{user\_priority level})/\text{priority\_weighted\_public\_user\_count})), \max(\text{Total\_Threshold}-\text{private\_traffic\_load}, \text{Pub\_Threshold})]$$

Thus, again the relax shaping process for public users takes into account the priority of the users, in that the user priority level is used as an adjustment factor to allow the calculated airtime for higher priority users to be larger than for lower priority users.

Thus, the described embodiment provides mechanisms to allow for the sharing of a Wi-Fi access point between both private and public users, and to allow for different classes of user to be differentiated therebetween. Moreover, the mechanisms also take into account the modulation being used by a particular WS, to prevent a WS at the edge of coverage or transmitting with low power and hence using an inefficient modulation scheme from using up more than its fair share of the wireless resource. Taken together, the mechanisms provide for a fairer distribution of the wireless access point resources between the wireless stations, whilst allowing the wireless access point operator to provide for classes of user and to be able to influence the wireless resource allocation between such user classes.

In terms of the elements that are performing the operation in the described embodiment, the modulation rate detector, user priority store, and policers and schedulers (as appropriate) are involved in the calculation and enforcement of the traffic flow control limits, and in some embodiments the relevant elements or functionality of each may be collectively considered as a traffic flow control calculator.

Various modifications may be made to the above described embodiment to provide further embodiments. For example, in a further embodiment there may be different rules regarding sharing of unused private or public capacity to those described. In addition, in a yet further embodiment different amounts of different Access Category traffic for different priority users may be allowed.

Further embodiments, provided by way of modification either by addition, deletion, or substitution of features of the above described embodiment will be apparent to the intended reader being a person skilled in the art, and are intended to be encompassed by the appended claims.

The invention claimed is:

1. A method for controlling data traffic in a wireless local area network (WLAN), comprising:
    determining respective priority levels for wireless stations communicating with a wireless access point;
    calculating wireless traffic load on the WLAN as a sum across the wireless stations of a ratio of a wireless station data rate to a modulation rate; and
    for a wireless station, setting a traffic flow control limit in dependence on the wireless station priority level and the calculated wireless traffic load;
    wherein the setting comprises reducing a traffic flow control limit when the wireless traffic load is above a threshold level, and increasing the traffic flow control limit when the wireless traffic load is below the threshold level.

2. A method according to claim 1, wherein the setting further comprises:
    determining a priority weighted user count in dependence on the user priority levels, wherein a higher priority user contributes to the count more than a lower priority user; and using the priority weighted user count to calculate a minimum priority weighted airtime threshold in dependence on a traffic threshold value and the priority weighted user count;

wherein the traffic flow control limit is further set in dependence on the minimum priority weighted airtime threshold.

3. A method according to claim 2, wherein for reducing a wireless station's traffic flow control limit, the limit is set to the higher of:
   i) a first value calculated in dependence on the wireless station's present limit and a ratio of the traffic threshold value and the calculated wireless traffic load; or
   ii) a second value calculated in dependence on the minimum priority weighted airtime threshold and the wireless station priority level, wherein a higher wireless station priority level results in a higher calculated second value.

4. A method according to claim 2, wherein for increasing a wireless station's traffic flow control limit, the limit is set to the lower of:
   i) a third value calculated in dependence on the wireless station's present limit, a free air time amount, the wireless station priority level, and the priority weighted user count; or
   ii) a fourth value calculated in dependence on a difference between a total available traffic level and a current traffic load for a further class of wireless stations, and the traffic threshold value.

5. A method according to claim 4, wherein the wireless stations are public wireless stations, the further class of wireless stations comprising private wireless stations.

6. A method according to claim 5, further comprising, for a private wireless station, when reducing a private wireless station's traffic flow control limit, the limit is set to the greater of:
   i) a fifth value corresponding to the wireless station's present airtime allocation scaled by a scaling value calculated in dependence on a private airtime threshold and total private airtime usage; or
   ii) a sixth value corresponding to a substantially equal distribution of the private airtime threshold over the number of private wireless stations.

7. A method according to claim 6, further comprising, for a private wireless station, when increasing a private wireless station's traffic flow control limit, the limit is set to the lesser of:
   i) a seventh value calculated in dependence on the wireless station's present airtime allocation, a free airtime amount and the number of private users; or
   ii) an eighth value corresponding to the greater of:
      a) a difference between the total available traffic level and the current traffic load for the public wireless stations; and
      b) a traffic threshold value for the private stations.

8. A wireless local area network access point comprising: traffic flow control system circuitry to:
   i) determine respective priority levels from a user priority store for wireless stations communicating with a wireless access point;
   ii) calculate wireless traffic load on the WLAN as a sum across the wireless stations of a ratio of a wireless station data rate to a modulation rate as determined by a modulation rate detector; and
   iii) for a wireless station, set a traffic flow control limit in dependence on the wireless station priority level and the calculated wireless traffic load;
   wherein the setting comprises reducing a traffic flow control limit when the wireless traffic load is above a threshold level, and increasing the traffic flow control limit when the wireless traffic load is below the threshold level.

9. A wireless local area network access point according to claim 8, wherein the setting further comprises:
   determining a priority weighted user count in dependence on the user priority levels, wherein a higher priority user contributes to the count more than a lower priority user; and
   using the priority weighted user count to calculate a minimum priority weighted airtime threshold in dependence on a traffic threshold value and the priority weighted user count;
   wherein the traffic flow control limit is further set in dependence on the minimum priority weighted airtime threshold.

10. A wireless local area network access point according to claim 9, wherein for reducing a wireless station's traffic flow control limit, the limit is set to the higher of:
    i) a first value calculated in dependence on the product of the wireless station's present limit and a ratio of the traffic threshold value and the calculated wireless traffic load; or
    ii) a second value calculated in dependence on the minimum priority weighted airtime threshold and the wireless station priority level, wherein a higher wireless station priority level results in a higher calculated second value.

11. A wireless local area network access point according to claim 10, wherein for increasing a wireless station's traffic flow control limit, the limit is set to the lower of:
    i) a third value calculated in dependence on the wireless station's present limit, a free air time amount, the wireless station priority level, and the priority weighted user count; or
    ii) a fourth value calculated in dependence on a difference between a total available traffic level and a current traffic load for a further class of wireless stations, and the traffic threshold value.

12. A wireless local area network access point according to claim 11, wherein the wireless stations are public wireless stations, the further class of wireless stations comprising private wireless stations.

13. A wireless local area network access point according to claim 12, further comprising, for a private wireless station, when reducing a private wireless station's traffic flow control limit, the limit is set to the greater of:
    i) a fifth value corresponding to the wireless station's present airtime allocation scaled by a scaling value calculated in dependence on a private airtime threshold and total private airtime usage; or
    ii) a sixth value corresponding to a substantially equal distribution of the private airtime threshold over the number of private wireless stations;
    or when increasing a private wireless station's traffic flow control limit the limit is set to the lesser of:
    i) a seventh value calculated in dependence on the wireless station's present airtime allocation, a free airtime amount, and the number of private users; or ii) an eighth value corresponding to the greater of:
   a) a difference between the total available traffic level and the current traffic load for the public wireless stations; and
   b) a traffic threshold value for the private stations.

\* \* \* \* \*